US010832306B2

(12) United States Patent
Greenberger et al.

(10) Patent No.: US 10,832,306 B2
(45) Date of Patent: Nov. 10, 2020

(54) USER ACTIONS IN A PHYSICAL SPACE DIRECTING PRESENTATION OF CUSTOMIZED VIRTUAL ENVIRONMENT

(71) Applicant: International Business Machines Corporation, Armonk, NY (US)

(72) Inventors: Jeremy A. Greenberger, Raleigh, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/266,815

(22) Filed: Sep. 15, 2016

(65) Prior Publication Data

US 2018/0075510 A1    Mar. 15, 2018

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0251* (2013.01); *G06Q 30/0255* (2013.01); *G06Q 30/0261* (2013.01); *G06Q 30/0267* (2013.01); *G06Q 30/06* (2013.01); *G06Q 30/0629* (2013.01); *G06Q 30/0641* (2013.01)

(58) Field of Classification Search
CPC ........... G06Q 30/0251; G06Q 30/0255; G06Q 30/0261; G06Q 30/0267; G06Q 30/06; G06Q 30/0629; G06Q 30/0631
See application file for complete search history.

(56) References Cited

U.S. PATENT DOCUMENTS

| 7,848,764 | B2* | 12/2010 | Riise | G06Q 30/00 455/456.1 |
| 8,073,460 | B1* | 12/2011 | Scofield | H04W 4/21 455/456.1 |
| 8,401,897 | B1* | 3/2013 | Chatterjee | G06Q 30/0261 705/14.1 |
| 8,412,577 | B2* | 4/2013 | Rodriguez | G06F 3/011 382/100 |

(Continued)

OTHER PUBLICATIONS

"Google Boost Lets Local Businesses Create Search Ads," eWeek: NA. Ziff Davis Enterprise (Oct. 26, 2010) (Year: 2010).*

(Continued)

*Primary Examiner* — Anne M Georgalas
(74) *Attorney, Agent, or Firm* — Grant Johnson

(57) ABSTRACT

A system and method for adjusting content in a virtual environment based on dwell time in physical spaces is disclosed. The method includes defining, by a zone-to-virtual content mapping module, a zone in a physical space and tagging the defined zone with descriptive information. The method may also include detecting, by a mobile device detection module, a mobile device within the zone, as well as the dwell time of the device. Additionally, the method may include, by a virtual content ranking module, assigning an interest level to the dwell time and assigning a ranking to an element of content in a virtual environment that corresponds to the interest level. The interest level can be stored in a user profile. Elements of content can be adjusted in the virtual environment according to their assigned ranking, and they can be displayed to a user.

15 Claims, 10 Drawing Sheets

(56) References Cited

U.S. PATENT DOCUMENTS

| | | | | |
|---|---|---|---|---|
| 8,442,974 | B2* | 5/2013 | Young | G06F 16/9535 |
| | | | | 707/723 |
| 8,612,278 | B1* | 12/2013 | Ashley, Jr. | G06Q 30/02 |
| | | | | 705/7.25 |
| 9,032,290 | B2* | 5/2015 | Shepherd | G06Q 50/01 |
| | | | | 715/262 |
| 9,219,788 | B1* | 12/2015 | Buron | H04L 67/18 |
| 9,747,497 | B1* | 8/2017 | Sharma | G06K 9/00771 |
| 9,891,064 | B2* | 2/2018 | Shah | G01C 21/3484 |
| 10,242,374 | B2* | 3/2019 | Linden | G06Q 50/01 |
| 10,360,571 | B2* | 7/2019 | Garel | G06Q 30/0224 |
| 2006/0020679 | A1* | 1/2006 | Hinton | G06F 21/41 |
| | | | | 709/217 |
| 2006/0074769 | A1* | 4/2006 | Looney | G06Q 30/02 |
| | | | | 705/14.66 |
| 2007/0005419 | A1* | 1/2007 | Horvitz | G06Q 30/02 |
| | | | | 701/533 |
| 2007/0185844 | A1* | 8/2007 | Schachter | G06F 16/9535 |
| 2008/0004884 | A1* | 1/2008 | Flake | G06Q 30/02 |
| | | | | 705/1.1 |
| 2011/0223895 | A1* | 9/2011 | Wagda | H04W 4/23 |
| | | | | 455/414.2 |
| 2011/0307411 | A1 | 12/2011 | Bolivar et al. | |
| 2011/0314502 | A1* | 12/2011 | Levy | H04N 7/106 |
| | | | | 725/46 |
| 2012/0016733 | A1 | 1/2012 | Belvin et al. | |
| 2012/0100869 | A1* | 4/2012 | Liang | G06Q 30/0261 |
| | | | | 455/456.1 |
| 2012/0239506 | A1* | 9/2012 | Saunders | G06Q 30/02 |
| | | | | 705/14.67 |
| 2012/0259695 | A1* | 10/2012 | Glassman | G06Q 30/02 |
| | | | | 705/14.41 |
| 2012/0271715 | A1* | 10/2012 | Morton | G06Q 30/0257 |
| | | | | 705/14.53 |
| 2013/0110627 | A1* | 5/2013 | Guha | G06Q 30/0275 |
| | | | | 705/14.54 |
| 2013/0138499 | A1* | 5/2013 | Tu | G06Q 30/0241 |
| | | | | 705/14.41 |
| 2013/0179441 | A1 | 7/2013 | Kuusik | |
| 2013/0267253 | A1* | 10/2013 | Case | H04W 4/021 |
| | | | | 455/456.3 |
| 2013/0346877 | A1* | 12/2013 | Borovoy | G06Q 10/10 |
| | | | | 715/753 |
| 2014/0149202 | A1* | 5/2014 | Owen | G06Q 30/0235 |
| | | | | 705/14.35 |
| 2014/0280214 | A1 | 9/2014 | Han et al. | |
| 2014/0280890 | A1 | 9/2014 | Yi et al. | |
| 2015/0039422 | A1 | 2/2015 | Abraham et al. | |
| 2015/0178790 | A1 | 6/2015 | Yi et al. | |
| 2016/0188741 | A1* | 6/2016 | Wexler | H04L 67/22 |
| | | | | 705/14.46 |
| 2016/0292744 | A1* | 10/2016 | Strimaitis | G06Q 30/0269 |
| 2017/0178178 | A1* | 6/2017 | Zhang | G06Q 30/0243 |
| 2018/0049003 | A1* | 2/2018 | Maulsby | G06Q 10/00 |

OTHER PUBLICATIONS

Greenberger et al., "User Actions in a Physical Space Directing Presentation of Customized Virtual Environment," U.S. Appl. No. 15/853,084, filed Dec. 22, 2017.

List of IBM Patents or Patent Applications Treated as Related, Signed Dec. 22, 2017, 2 pages.

Lee et al., "Method and System for Ranking Query Suggestions," An IP.com Prior Art Database Technical Disclosure, IP.com No. IPCOM000210019D, IP.com Electronic Publication Date: Aug. 22, 2011, pp. 1-9. http://ip.com/IPCOM/000210019.

Yi et al., "System and Method for Normalizing User Engagement Signal for a content Based on Predicted Dwell time," An IP.com Prior Art Database Technical Disclosure, IP.com No. IPCOM000237240D, IP.com Electronic Publication Date: Jun. 10, 2014, pp. 1-2. http://ip.com/IPCOM/000237240.

* cited by examiner

STATE UNIVERSITY WEBSITE 500

CUSTOM HOMEPAGE 565

USER PROFILE 560

STUDENT DWELL TIMES 565

CHEMISTRY DEPARTMENT 567: 14 HRS
PHYSICS DEPARTMENT 568: 6 HRS
MATH DEPARTMENT 569: 3 HRS

MENU 570
- CHEM DEPT. 572
- REGISTRAR 528
- CALENDAR 526
- ACADEMICS 524

NEWS 580
- TREATING CANCER WITH GOLD NANOPARTICLES 582
- MATH CAMP FOR LOCAL KIDS 584
- U PRESIDENT TO RETIRE NEXT YEAR 542

EVENTS 590
- REGIONAL BIOCHEM CONFERNCE 592
- GUEST LECTURE: DR. SIGRID LUND, POLYMERS 556
- PANEL DISCUSSION: DIGITAL FUTURES 552

FIG. 5B

USER PROFILE 160

| ZONE VISITS 607 AND DWELL TIMES 610 | | PURCHASES 630 |
|---|---|---|
| ELECTRONICS STORE 612: | MOBILE PHONES 618, 7 MIN<br>TELEVISIONS 620, 18 MIN | MOBILE PHONE 632 |
| ART MUSEUM 614: | DUTCH PAINTERS 622, 25 MIN | |
| GROCERY STORE 616: | PET SUPPLIES 624, 20 MIN<br>GARDENING SUPPLIES 626, 15 MIN<br>BAKERY 628, 3 MIN | CAT LITTER 634<br>CARROT SEEDS 636 |

FIG. 6A

USER ACTIONS IN A PHYSICAL SPACE DIRECTING PRESENTATION OF CUSTOMIZED VIRTUAL ENVIRONMENT

BACKGROUND

The present disclosure relates to data processing techniques and, more specifically, to managing how content in a virtual environment is ranked and presented.

Targeting intended audiences is a common strategy in information distribution. One part of this strategy can involve determining who might be receptive to the information being distributed. This determination can be aided by data pertaining to people or groups of people. Relevant data may include details about people's habits, possessions, culture, location, age, etc.

SUMMARY

Various embodiments are directed to a computer-implemented method for adjusting content in a virtual environment based on dwell time in physical spaces. The method may include defining, by a zone-to-virtual content mapping module, at least one zone in a physical space and tagging the defined zone with descriptive information. The method may also include detecting, by a mobile device detection module, a mobile device within the zone. The mobile device can be detected by at least one mobile device detector. A dwell time of the mobile device may also be determined by the mobile device detection module. Additionally, the method may include, by a virtual content ranking module, assigning an interest level to the dwell time and assigning a ranking to an element of content in a virtual environment that corresponds to the interest level. The virtual environment may be a website. The method may also include storing the interest level in a user profile, which can be a federated user profile. The element of content can be adjusted in the virtual environment according to its assigned ranking, and it can be displayed to a user. Adjusting the elements of content can involve altering, repositioning, adding, or removing elements. The elements of content may be words, numbers, symbols, images, or colors.

BRIEF DESCRIPTION OF THE DRAWINGS

FIG. 5B is a diagrammatic representation of a user profile and a customized university website, according to some embodiments.

FIG. 6A is a diagrammatic representation of an example of a user profile, according to some embodiments.

DETAILED DESCRIPTION

Figure 1:
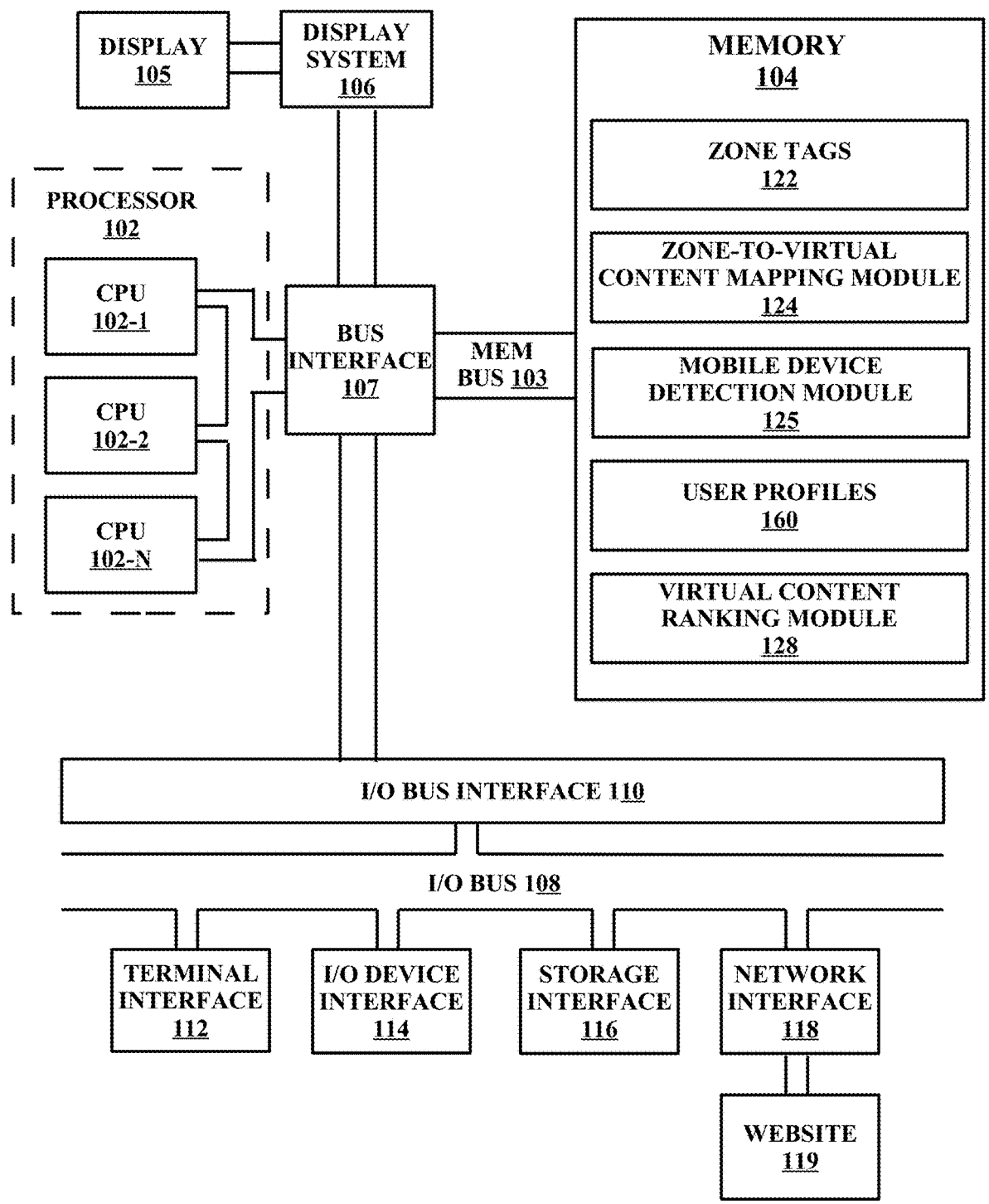
FIG. 1 illustrates a computer system according to embodiments of the present disclosure.

FIG. 1 shows a high-level block diagram of an example computer system 100 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 100 may comprise one or more processors 102, a memory subsystem 104, a terminal interface 112, a storage interface 116, an I/O (input/output) device interface 114, and a network interface 118 that could be connected to a website 119. These components may be communicatively coupled, directly or indirectly, for inter-component communication via a memory bus 103, an I/O bus 108, bus interface unit 107, and an I/O bus interface unit 110.

The computer system 100 may contain one or more general-purpose programmable central processing units (CPUs) 102-1, 102-2, and 102-N, herein generically referred to as the CPU 102. In some embodiments, the computer system 100 may contain multiple processors typical of a relatively large system; however, in other embodiments the computer system 100 may alternatively be a single CPU system. Each CPU 102 may execute instructions stored in the memory subsystem 104 and may include one or more levels of on-board cache.

The memory 104 may include a random-access semiconductor memory, storage device, or storage medium (either volatile or non-volatile) for storing or encoding data and programs. In some embodiments, the memory 104 represents the entire virtual memory of the computer system 100, and may also include the virtual memory of other computer systems coupled to the computer system 100 or connected via a network. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. The memory 104 may store all or a portion of the following: a set of zone tags 122, a zone-to-virtual content mapping module 124, a mobile device detection module 125, a virtual content ranking module 128, and a set of user profiles 160.

The set of zone tags 122 may comprise descriptive information about the location and borders of one or more spatial zones within a physical location, as well as tags describing the content of each zone. These zones may be differentiated based on various criteria related to their contents and tagged accordingly. Descriptive information about the content of the zones may also be stored here.

The zone-to-virtual content mapping module 124 can connect tags related to the spatial zones, stored in the set of zone tags 122, to related content in a virtual environment, referred to herein as "virtual content." The virtual environment may be a website 119, computer desktop display, mobile application, etc. Examples of websites can include retail websites, university websites, news websites etc. Linking information about spatial zones to content in a virtual environment allows adjustments to be made when displaying the content to the user. The virtual content may be text, colors, shapes, pictures, videos, animations, etc.

The mobile device detection module 125 may carry out processes for detecting a mobile device carried by a user within a spatial zone. It may work in concert with mobile device detectors and proximity detection technology, such as Bluetooth beacons, Wi-Fi triangulation, and geolocation. It can also record the length of time spent within the zone (dwell time). This information about a user's zone visits and dwell times can be stored in a user profile 160.

A virtual content ranking module 128 can assign interest levels to content that may appeal to a user. These interest levels may be saved in a user profile 160. The interest levels can be based on contextual information such as dwell time, zone content, purchases, etc. The virtual content ranking module can also rank and select content that may be displayed in a virtual environment. The virtual content can be ranked by how related it is to information stored in a user profile 160, such as zone visits, dwell times, and purchases. Virtual content related to information in the user profile 160 is likely to be of interest to the user. Content with high rankings (e.g., content that may be of interest to the user) may be selected to be displayed in a virtual environment, such as a website 119, viewed by the user.

A user profile 160 associates information about a user with the user and/or their devices, accounts, etc. This information can be in the form of "interest levels" that indicate which contents may be relevant to the user. The interest levels can incorporate information about the user's browsing history within physical locations. They can be based zones the user visited, as well as their dwell time within each zone. Additionally, the interest levels can be based on information related to purchases the user makes while in a physical location. The user profile 160 can also be federated so that it may be stored in multiple locations, such as identity management systems.

While components 122, 124, 125, 128, and 160 are illustrated as being included within the memory 104 in the computer system 100, in other embodiments, some or all of these components may be on different computer systems, and may be accessed remotely, e.g., via a network. The computer system 100 may use virtual addressing mechanisms that allow the programs of the computer system 100 to behave as if they only have access to a large, single storage entity instead of access to multiple, smaller storage entities. Thus, while the set of zone tags 122, the zone-to-virtual content mapping module 124, the mobile device detection module 125, the virtual content ranking module 128, and the set of user profiles 160 are illustrated as being included within the memory 104, these components are not necessarily all completely contained in the same storage device at the same time. Further, although the set of zone tags 122, the zone-to-virtual content mapping module 124, the mobile device detection module 125, the virtual content ranking module 128, and the set of user profiles 160 are illustrated as being separate entities, in other embodiments some of these components, portions of some of these components, or all of these components may be packaged together.

In an embodiment, the set of zone tags 122, the zone-to-virtual content mapping module 124, the mobile device detection module 125, the virtual content ranking module 128, and the set of user profiles 160 may include instructions that execute on the processor 102 or instructions that are interpreted by instructions that execute on the processor 102 to carry out the functions as further described in this disclosure. In another embodiment, the set of zone tags 122, the zone-to-virtual content mapping module 124, the mobile device detection module 125, the virtual content ranking module 128, and the set of user profiles 160 are implemented in hardware via semiconductor devices, chips, logical gates, circuits, circuit cards, and/or other physical hardware devices in lieu of, or in addition to, a processor-based system. In another embodiment, the set of zone tags 122, the zone-to-virtual content mapping module 124, the mobile device detection module 125, the virtual content ranking module 128, and the set of user profiles 160 may include data in addition to instructions or statements.

Although the memory bus 103 is shown in FIG. 1 as a single bus structure providing a direct communication path among the CPUs 102, the memory subsystem 104, the display system 106, the bus interface 107, and the I/O bus interface 110, the memory bus 103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 108 are shown as single respective units, the computer system 100 may, in some embodiments, contain multiple I/O bus interface units 110, multiple I/O buses 108, or both. Further, while multiple I/O interface units are shown, which separate the I/O bus 108 from various communications paths running to the various I/O devices, in other embodiments some or all of the I/O devices may be connected directly to one or more system I/O buses.

The computer system 100 may include a bus interface unit 107 to handle communications among the processor 102, the memory 104, a display system 106, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 106 may include a display controller. The display controller may provide visual, audio, or both types of data to a display device 105. The display system 106 may be coupled with a display device 105, such as a standalone display screen, computer monitor, television, or a tablet or handheld device display. In alternate embodiments, one or more of the functions provided by the display system 106 may be on board a processor 102 integrated circuit. In addition, one or more of the functions provided by the bus interface unit 107 may be on board a processor 102 integrated circuit.

In some embodiments, the computer system 100 may be a multi-user mainframe computer system, a single-user system, or a server computer or similar device that has little or no direct user interface, but receives requests from other computer systems (clients). Further, in some embodiments, the computer system 100 may be implemented as a desktop computer, portable computer, laptop or notebook computer, tablet computer, pocket computer, telephone, smart phone, network switches or routers, or any other appropriate type of electronic device.

It is noted that FIG. 1 is intended to depict the representative major components of an exemplary computer system 100. In some embodiments, however, individual components may have greater or lesser complexity than as represented in FIG. 1, components other than or in addition to those shown in FIG. 1 may be present, and the number, type, and configuration of such components may vary.

Figure 2:
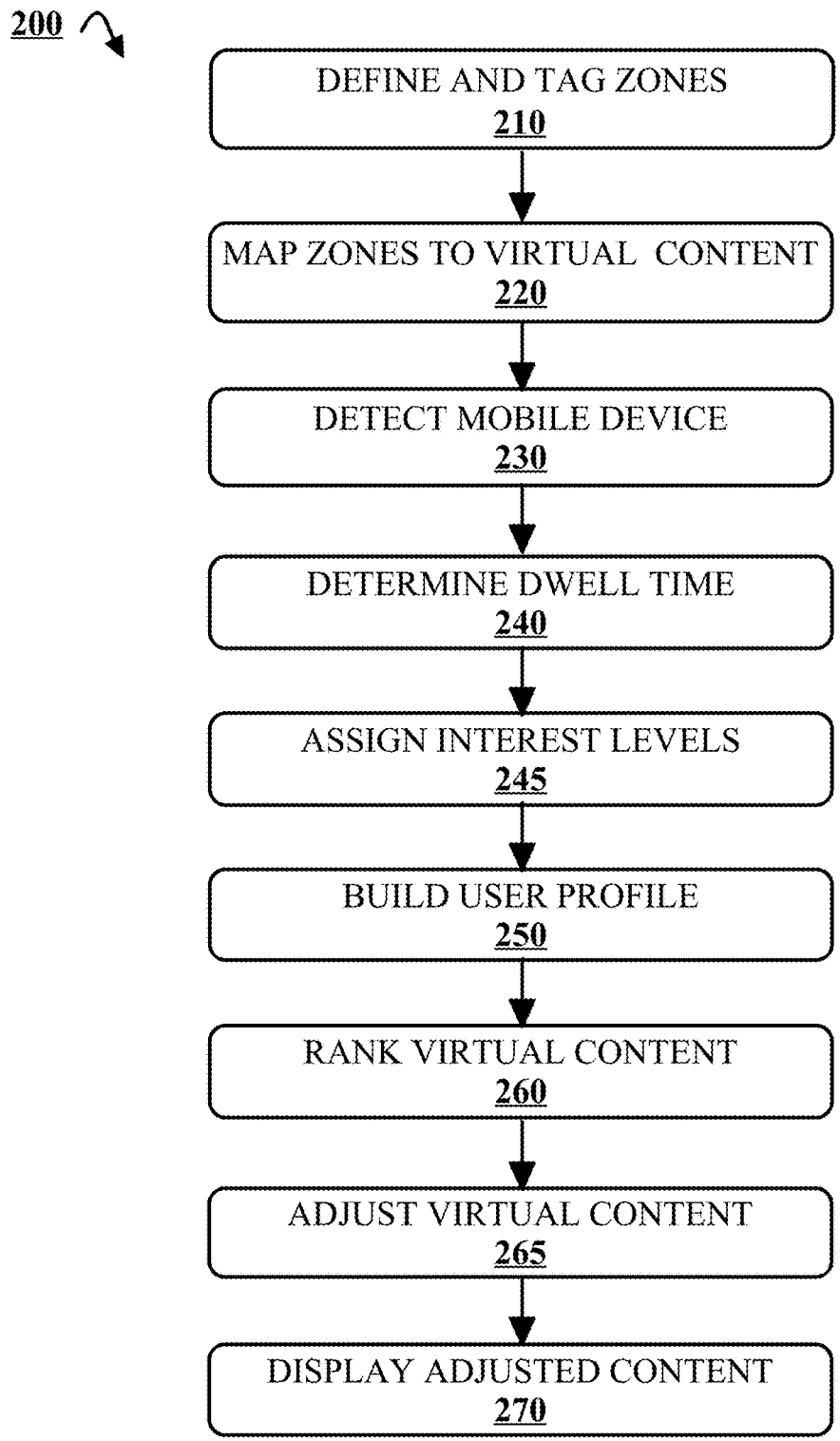
FIG. 2 is a flow diagram illustrating a process for ranking and customizing the presentation of virtual content, according to some embodiments of the present disclosure.

FIG. 2 is a flow diagram illustrating a process 200 for ranking and customizing the presentation of virtual content, according to some embodiments of the present disclosure. Process 200, which can be carried out by a computer processor 102, may involve gathering data about the dwell time of a user in a physical location, and using this data to adjust the presentation of content in a virtual environment to the user. The user may be anyone whose actions are tracked while in a physical location. Examples of users may include a shopper in a department store, a student on a college campus, a person visiting an event, etc. In many cases, the virtual environment can be a website, such as a retail website, a university website, etc.

In operation 210, spatial zones are defined within a physical location and the zones are tagged with information about their contents, which may be stored in set of zone tags 122 in a computer memory 104. A physical space may be a department store, a specialty retail store, a shopping mall, or any other type of retail venue. However, the physical space is not limited to retail spaces. In other embodiments, the physical space may be an environment that can be sectioned or zoned, such as a library, an office building, a museum, a university campus, etc.

Zones can be differentiated and tagged according to their contents or category. For example, in a department store, a shoe department may be marked zone 1, an electronics department may be marked zone 2 and a women's clothing department may be marked zone 3, such as those illustrated in FIG. 4. Zones may be established at any desired level of granularity or physical size. A zone may be an entire department, a particular aisle or section within department, or particular section of an aisle or section. As a second example, a zone may be an area of a mobile phone section of an electronics department where a particular brand of mobile phone is stocked or displayed. In yet another example, zones may be established for academic departments or other locations in a variety of buildings on a university campus. In some embodiments, spatial zones can be linked to devices that implement methods for detection of mobile devices. The information delineating zone borders and content can be stored in a computer memory 104 as a set of zone tags 122.

Once the spatial zones are defined in operation 210, they are mapped to content that can be displayed to a viewer in operation 220. This content could be displayed to a viewer in at least one virtual environment, such as a website 119, a computer display 105, etc. Tags associated with zones can be used to map a zone in a physical location to content that belongs to a category in the virtual environment. In some embodiments, the physical location and the content presented in a virtual environment (virtual content) belong to similar categories. For example, a shoe department in a retail location can be mapped to a website selling shoes or related products. In another case involving retail, a zone tagged "astronomy" in a bookstore could correspond to content related to astronomy books on one or more websites. This virtual content could include a selection of items available at an online retailer, such as books and documentaries about the solar system, space travel, or other topics pertaining to astronomy. A zone-to-virtual content mapping module 124 may be used to carry out operation 220.

In a university campus example illustrating operation 220, zones could be established for academic departments in campus buildings. These zones may be linked to the academic departments' pages on the university website or website content related to the department categories. For instance, a zone encompassing a chemistry department could be linked to the chemistry department webpage, links to course syllabi within that department, seminars and other events hosted by the department, etc.

In operation 230, the user's placement within a physical location is determined. The user's placement may be determined by a mobile device they are carrying. Examples of mobile devices may include tablets, mobile phones, wearable technology (e.g., smart watches), etc. Defined spatial zones within the physical location can be equipped with technology designed to detect mobile devices, such as Bluetooth beacons placed within the zone, Wi-Fi triangulation, or geolocation. However, other systems and methods for determining a user's location may be used. The location of a mobile device carried by a user can be ascertained by detecting an identifier unique to the device. This identifier could be a MAC address or Unique Device ID, a mobile application, or a social networking profile, to name a few examples.

Figure 3:
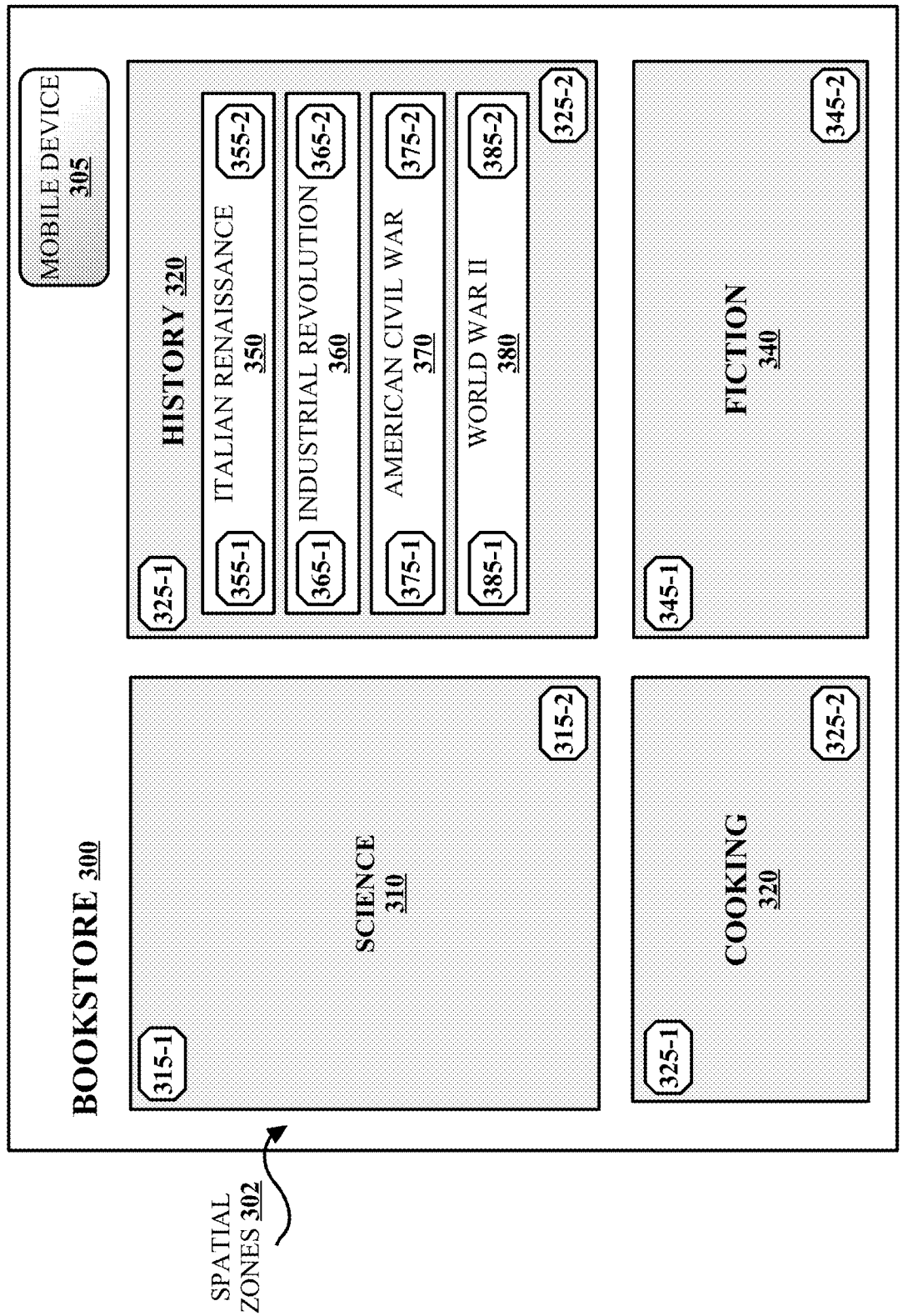
FIG. 3 is a diagrammatic representation of one example of a retail location with designated spatial zones, according to some embodiments of the present disclosure.

Referring now to FIG. 3, an exemplary bookstore 300 containing a group of spatial zones 302 with detectors that can locate mobile devices, as in operation 230, is illustrated. In this example, if a user were in the section of the bookstore 300 containing science books 310, their mobile device 305 could be located by detectors 315-1 and 315-2. Similarly, if the user were in the history section 320, the device 305 could be located by detectors 325-1 and 325-2. In the cooking section 330, the device 305 could be located by detectors 335-1 and 335-2 and, in the fiction section 340, by detectors 345-1 and 345-2. Within a physical location, the size and specificity of the spatial zones can vary.

FIG. 3 also illustrates how the bookstore's history section 320 could itself be divided into spatial zones. Examples of these zones can include sections devoted to popular historical topics, such as the Italian Renaissance 350 with detectors 355-1 and 355-2, the Industrial Revolution 360 with detectors 365-1 and 365-2, the American Civil War 370 with detectors 375-1 and 375-2, and World War II 380 with detectors 385-1 and 385-2. While FIG. 3 illustrates two detectors in each section, it should be recognized that any number of detectors may be present.

Referring back to FIG. 2, in operation 240, the amount of time the user spends in a physical location, or dwell time, is determined. Dwell time may refer to how long the mobile device carried by the user is detected within a zone. Location and dwell time data may be collected with the aid of a mobile device detection module 125 stored in a computer memory 104. The dwell time data determined in operation 240 may be combined with other information collected about the user, such as a record of their previous purchases, as well as any other information relevant to their habits and interests, such as the time of year or location in which they live. This information can be associated with the user's user profile 160, and is discussed in greater detail below.

In operation 245, interest levels indicating a user's probable interest in particular categories are assigned. The interest levels may be determined by a virtual content ranking module 128 and interest levels can be determined by a user's location, dwell times, and/or other information. There are numerous factors that could be involved in assigning interest levels, as will be discussed herein. Continuing the bookstore example that was discussed with reference to FIG. 3, the location and dwell time corresponding to the detected mobile device 305 may be used to assign interest levels. If a shopper's mobile device is located by detectors 385-1 and 385-2, a record of the shopper browsing books about World War II in zone 380 can be recorded and used to assign a higher interest level in that topic. Further, the bookstore shopper may visit zones designating different galleries. If this bookstore shopper's location in a gallery exhibiting works by World War II combat artists is detected, the World War II interest level recorded in their user profile could be raised.

Dwell time may be another factor in assigning interest levels, according to some embodiments. If the bookstore shopper's mobile device 305 were detected in both the cooking section 330 and the fiction section 340, their interest levels for both topics might be recorded as equal. However, if their dwell time in each section were determined and found to be 4 minutes in the cooking section 330 and 30 minutes in the fiction section 340, their interest in fiction could be ranked higher than their interest in cooking. In some embodiments, dwell time ranges that correspond to levels of interest could be set. For example, 0-5 minutes in a zone may indicate low interest, 6-10 minutes could indicate moderate interest, and 11 minutes or longer could indicate high interest. However, other ranges can also be used and other methods may be used to identify interest in a section.

Returning to FIG. 2 and operation 245, it can be noted that still more factors may be taken into account when assigning interest levels. One of these factors may be a customer's purchase history. If a shopper's dwell time indicates that they spent time browsing a spatial zone tagged as, for example, a retail location's shoe department, a website may be directed to advertise shoes when visited by the customer. However, if the customer purchased a pair of shoes after browsing the shoe department, they may be less likely to purchase shoes online shortly afterward. This purchase information may lower the interest level in shoes that was assigned in operation 245. However, this information could be used to raise the interest level for items commonly purchased along with shoes, such as socks or shoelaces.

Information about a user's purchase history can also be used to augment dwell time data when assigning interest levels in operation 245. Transaction information and purchase history may be obtained from a retailer's point of sale (POS) system. In some embodiments, the POS system may be associated with the retailer having the zone in which the user dwell time was detected. In other embodiments, transaction information may be obtained from a POS system not associated with the zone in which the user dwell time was detected. For example, a user may dwell for 30 minutes in a first retailer's shoe department, but a POS system in a second retailer may provide transaction information indicating that the user purchased shoes in a particular time frame. An example in which dwell time ranges were set so that a longer dwell time in a zone indicated a greater interest level in that content of that zone was discussed above. However, the length of time spent in a zone may not always be an accurate metric of a person's interests. In some cases, a user may enter a zone of interest already knowing what they plan to purchase. In an example such as this, a user may have a short dwell time in a zone, but their purchase history may show that they bought an item from a category related to that zone. This information could be used to raise their interest level in that category, despite the short visit.

Purchase history information could also relate to buying habits. For example, a shopper's purchase history may indicate that, whenever they've bought shoes in the past, the shoes have been made by one particular brand. Because of this, the shopper's interest level in shoes made by that brand may be raised in operation 245. Additionally, their interest level could be raised for items other than shoes made by that brand. It could also be that the shopper tends to buy their shoes from one particular store. Because of this, virtual content viewed by the shopper in the future may emphasize items or special offers from that store.

In some embodiments, seasonal factors may also be considered when assigning a user's interest level in operation 245. In one example, a user's location and dwell time data in December might suggest a high level of interest in buying children's toys, baking ingredients, and Christmas trees. However, taking into account that this data was collected in the days leading up to Christmas, it could be determined that interest levels in these types of products would be lower during the rest of the year. Additionally, in early January, a website might present this user with content that reflects their purchase history as well as the changing season. For example, many people buy Christmas trees during the Holiday Season and then dispose of them in January when Christmas is over. Because of this, the website may display an advertisement for a Christmas tree removal service at this time. Further, if the user had spent time in a physical location that sold Christmas trees before Christmas, a website may be directed to advertise a Christmas tree removal service after Christmas. In another seasonal example, a user may have a high dwell time in a spatial zone containing sporting goods at a retail location. In response to this, their interest level in, for instance, soccer gear during the summer and indoor sporting gear in the winter could be raised.

In operation 250, the interest levels assigned in operation 245 are used to build a user profile 160. A user profile 160, which can be stored in a computer memory 104, associates information about a user with the user and/or their devices, accounts, etc. The interest levels stored in the user profile 160 can be used to predict what types of content may attract the user. The interest levels could be based on data collected from multiple physical locations and zones, though they could also be based upon a visit to only one of these locations or zones. A user profile 160 may also be federated so that the information it contains can be shared with and used by multiple entities, one example being retailers.

In operation 260, virtual content can be ranked according to a user's interest levels, stored in their user profile 160. This can help determine how to present the virtual content in a way that appeals to the user. The ranking can be carried out by a virtual content ranking module 128 stored in a computer memory. Based on the virtual content rankings, one or more websites could customize their appearance so that, when the user visits, content related to their interests is emphasized.

Referring back to FIG. 3, an example of virtual content ranking, as in operation 260, is illustrated. Here, a user profile may indicate a high level of interest in World War II. This interest level could be determined by detection of the user's mobile device in both the World War II history section 380 of a bookstore 300 and in a museum gallery exhibiting the works of World War II combat artists. Given this information, virtual content related to World War II could be ranked higher than content related to other topics.

Returning to FIG. 2, in operation 265, virtual content rankings are used to adjust how content will be displayed to a user when they visit a virtual environment, such as a website. Adjusting elements of virtual content to display a customized view of a virtual environment to a user while they're browsing online can be implemented in multiple ways and a few are discussed here. Some methods include adjusting the virtual content by altering, repositioning, adding, or removing it. One approach is to reposition lists of product categories so that items of greater interest are nearer to the top. Alterations or other modifications can be made to any number of elements on in a virtual environment, such as a website. These elements may include things such as text, colors, shapes, pictures, videos, animations, etc.

Elements of virtual content can be altered in a variety of ways. For example, alterations may include changing the visibility, color, size, shape, or arrangement of the elements. In one example of an alteration, text could be emphasized by changing its size or font, or by making it bold or italicized. In another example of making adjustments to elements of virtual content based on virtual content rankings, a user may have recently browsed a department store's spatial zone containing silverware. In addition, they may have previously purchased dishes and napkins made by a particular brand of household goods. When this user visits a retail website, the website may be customized so that information related to silverware made by the same brand as the user's previously purchased dishes and napkins is emphasized. Examples of how these images may be emphasized include their being highlighted by bright colors and featured at the top of the website's front page.

In operation 270, the virtual content that was adjusted in operation 265 is displayed to the user. The content could be displayed in a virtual environment visited by the user, such as a website, a computer desktop, etc. In some embodiments, a federated user profile 160 can be used to direct the display of adjusted virtual content to the user on more than one website. For example, a user profile 160 may indicate that a user is interested in art. Then, when this user is later browsing the web they may see art related content on various websites. Examples of this could be advertisements for easels on an art supply website or books about landscape painting on a bookstore website. In addition, they might visit a news website and see notices for an upcoming exhibition at a local art gallery.

Figure 4A:
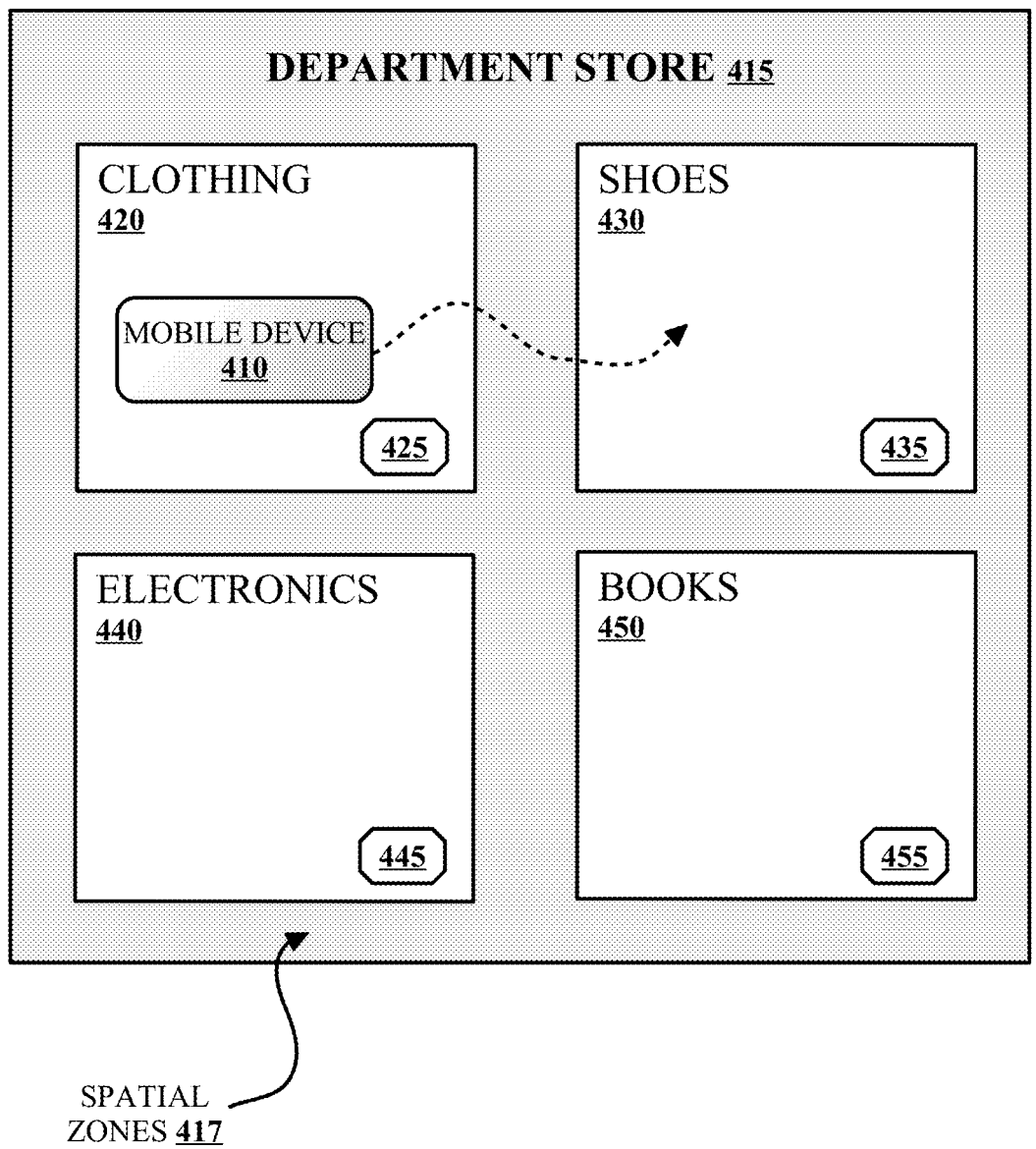
FIG. 4A is a diagrammatic representation of a physical location containing designated zones and a mobile device, according to some embodiments of the present disclosure.

FIG. 4A is a diagrammatic representation of a physical location containing designated zones 417 and a mobile device 410, according to some embodiments of the present disclosure. This diagram illustrates one example of the detection of a user's mobile device 410 in a physical location, in this case a department store 415. Using the approach discussed above with respect to FIG. 2, spatial zones 417 within the department store 415 can be delineated and tagged with information describing the category of their contents. This information can be stored in a set of zone tags 122 in a computer memory 104. In the example depicted in FIG. 4, there are four designated zones in the department store 415. These zones are tagged Clothing 420, Shoes 430, Electronics 440, and Books 450, though these examples are not limiting and zones can vary in number, size, specificity, etc.

Figure 4B:
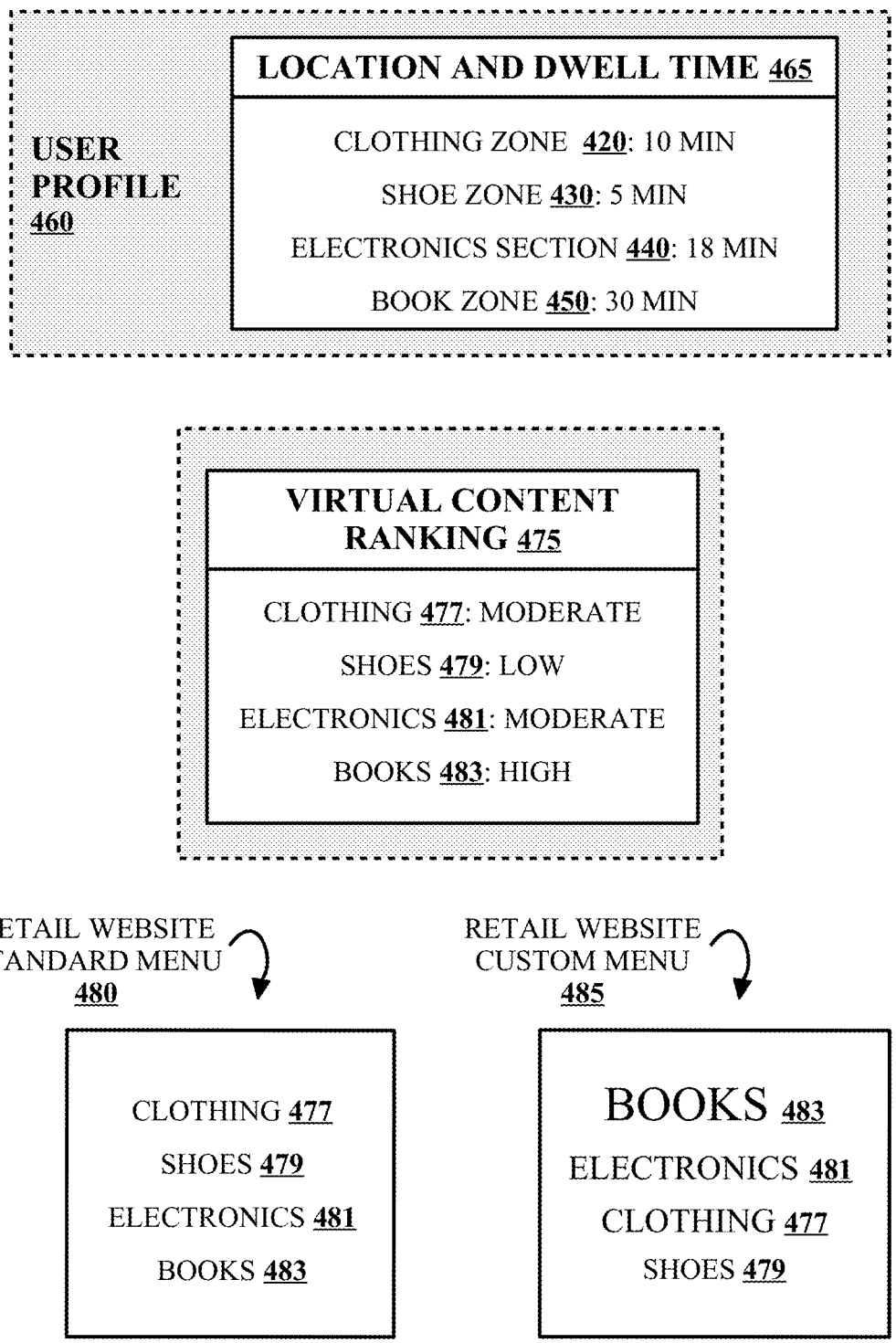
FIG. 4B is a diagrammatic representation of a user profile, a set of virtual content rankings, and a retail website homepage, according to some embodiments of the present disclosure.

The user's mobile device 410, shown in FIG. 4A, can be located by detectors that are placed within spatial zones 417 in the department store 415. These detectors can be configured to detect mobile devices. FIG. 4A illustrates a detector 425 in the clothing zone 420, a detector 435 in the shoe zone 430, a detector 445 in the electronics zone 440, and a detector 455 in the book zone 450. The user's location and dwell time can be determined when a detector locates their mobile device 410 within its zone. FIG. 4B shows an example of a user profile 460 containing this location and dwell time data 465.

FIG. 4B illustrates a diagram of a user profile, a set of virtual content rankings, and a retail website homepage, according to some embodiments. This diagram shows an example of how location and dwell time data stored in a user profile 460 can be used to direct the customization of virtual content presentation. Using the approach discussed above with respect to FIG. 2, the user spent 10 minutes in the department store's 415 clothing zone 420, 5 minutes in the shoe zone 430, 18 minutes in the electronics zone 440, and 40 minutes in the book zone 450. In operation 250, the information about the location and dwell time 460 of the mobile device 410 can be saved to the user profile 460.

Additionally, dwell time ranges that designate the shopper's interest level in each category may be set. In some cases, a shopper spending a long period of time in a particular zone may indicate that they have an interest in the category with which the zone is tagged. For example, 0-5 minutes could indicate low interest, 6-20 minutes could indicate moderate interest, and 21 minutes or higher could indicate high interest. From this data, the user's interest level in shoes could be considered low, their interest level in clothing and electronics moderate, and their interest level in books high. A virtual content ranking module 128 can be used, by a processor 102, to apply this interest level data to the ranking of content on a website visited by the user. The application of these rankings can involve adjusting the virtual content according to these interest levels. FIG. 4B illustrates an example of virtual content ranking 475, which herein correspond to the user's interest levels that were determined by the location and dwell time 465 of their mobile device 410. In this example, virtual content related to clothing 477 has a moderate ranking, content related to shoes 479 has a low ranking, content related to electronics 481 has a moderate ranking, and content related to books has a high ranking 483.

Virtual content ranking 475 can be used to direct the presentation of customized virtual content to the user. FIG. 4B shows two examples of menus from a retail website. One of these is a standard menu 480 and the other is a custom menu 485. The standard menu 480 shows content categories in the order: clothing 477, shoes 479, electronics 481, books 483. After taking into account the virtual content rankings based on the dwell times of the user, a customized menu 485 can be made and presented to the user. This new menu emphasizes content categories with the highest rankings. An example of how emphasis can be shown is by reordering the standard menu 480 of content categories so that categories with higher rankings are placed at the top of the list. The product categories in the new menu 480 are then presented in the order: books 483, electronics 481, clothing 477, shoes 479. In this example, emphasis is placed on categories corresponding to high and moderate interest levels (e.g., books 483, electronics 481, and clothing 477) by adjusting them in other ways as well. Examples of adding emphasis to categories shown in FIG. 4B include resizing them and changing their font, though other methods could be used.

Figure 5A:
FIG. 5A is a diagrammatic representation a standard university website, according to some embodiments of the present disclosure.

FIGS. 5A and 5B are diagrammatic representations that illustrate another example of a customization of the appearance of a website to match the user's determined interest levels, according to some embodiments. In this case, the website is a university website 500. FIG. 5A shows the university website's standard homepage 510, which is divided into three sections: menu 520, news 540, and events 550. On the menu 520, there is a list of links, presented in the order: admissions 522, academics 524, calendar 526, registrar 528. The standard homepage's news section 540 lists headlines of general interest. A link informing visitors that the university's president will retire 542 is at the top of the list, followed by links informing viewers that students at the university are helping out at a local middle school 544, and that the football team has won a championship game 546. The events section 550 lists links that advertise, in descending order, a panel discussion about digital futures 552, a theater department open house 554, and a guest lecture on chemistry, specifically polymers 556.

FIG. 5B is a diagrammatic representation of a user profile 560 and a customized university website homepage 565, according to some embodiments. The user profile 560 contains information about the student's dwell times 565 in various locations around the university's campus. In this example, a university website's 500 homepage is customized with regard to the student's user profile 560. Using the approach discussed above with respect to FIG. 2, it is determined that, in an average week, the student spends 14 hours in the chemistry department 567, 6 hours in the physics department 568, and 3 hours in the math department 569. Given these dwell times, the system can determine that the student is a chemistry major, or at least has an interest in the physical sciences. This information can be saved to the student's user profile 560. When the student later visits the university website 500, they may be presented with a homepage that has been customized to emphasize content deemed relevant to them.

FIG. 5B also illustrates the customized university homepage 565 viewed by the student discussed herein. On the customized homepage 565, the order of the links in each section is rearranged. In addition, some links that were present on the standard homepage 510 have been removed. Similarly, some links that were not on the standard home page 510 have been added to the customized page 565. Content presented on the customized homepage 565 may be directed to the student whose user profile 560 indicates that they may be a chemistry major or have an interest in the physical sciences.

The customized homepage 565 includes a customized menu section 570 that shows an example of how information can be displayed to the student so that virtual content related to interest levels stored in their user profile 560 is emphasized. The custom menu section 570, shown in FIG. 5B, presents links in the order: chemistry department 572, registrar 528, calendar 526, and academics 524. The admissions section 522 in the standard menu 520 has, in this example, received a low ranking in operation 260 because it is more relevant to prospective students than current ones. Therefore, it is not visible on the customized menu 570. A link to the chemistry department web page 572 is added to the customized menu 570 because the student in question spends a significant amount of time in that department's physical location on campus 567. In addition, the links to the registrar department 528 and the calendar 526 may be relevant to a current student and so have been placed ahead of academics 524 on the customized menu 570.

The customized homepage 565 in FIG. 5B has a news section 580 that has been altered relative to the standard homepage 540 in FIG. 5A. In the customized news section 580, headlines that may be of interest to a student studying science and math are emphasized. These include information about cancer research at the university 582 and a math oriented summer camp for local children 584 hosted by the university. The news that the president will retire 542 is still present, but is featured less prominently than it was in the standard news section 540.

The standard section announcing upcoming events 550 has also been rearranged to a custom events section 590 that may appeal to a student studying the physical sciences. A notice about a guest lecture on polymers 556 is moved from third place on the standard events list 550 to second on the custom list 590. Further, a link to information about a biochemistry conference 592 hosted by the university has been added to the custom menu 590 and a link advertising the theater department's open house 554, featured on the standard events list 550, is no longer visible. The link to information about a panel discussion about digital futures 552 is still present on the custom events list 590, but it is given less emphasis than the links relating to the biochemistry conference 592 and the polymers lecture 556, as these are determined by the system to be more closely related to the physical sciences.

FIG. 6A is a diagrammatic representation of an example of a user profile 160, according to some embodiments. The user profile 160 in FIG. 6A includes information about zones visited 607 by the user, their dwell time 610 within each zone, and the purchases they made while there 630. In this example, the user visited multiple zones located within three different physical locations: an electronics store 612, an art museum 614, and a grocery store 616. The spatial zones visited by the user within these physical locations, as well as their dwell times, are as follows: zones containing mobile phones 618 (7 min) and televisions 620 (20 min) within the electronics store 612; an exhibit of works by Dutch painters 622 (25 min) in the museum; and zones containing pet supplies 624 (20 min), gardening supplies 626 (15 min), and bakery items 628 (3 min) in the grocery store. The user profile 160 also has a record 630 of the user purchasing a mobile phone 632 from the electronics store 612, as well as cat litter 634 and carrot seeds 636 from the grocery store 616.

Figure 6B:
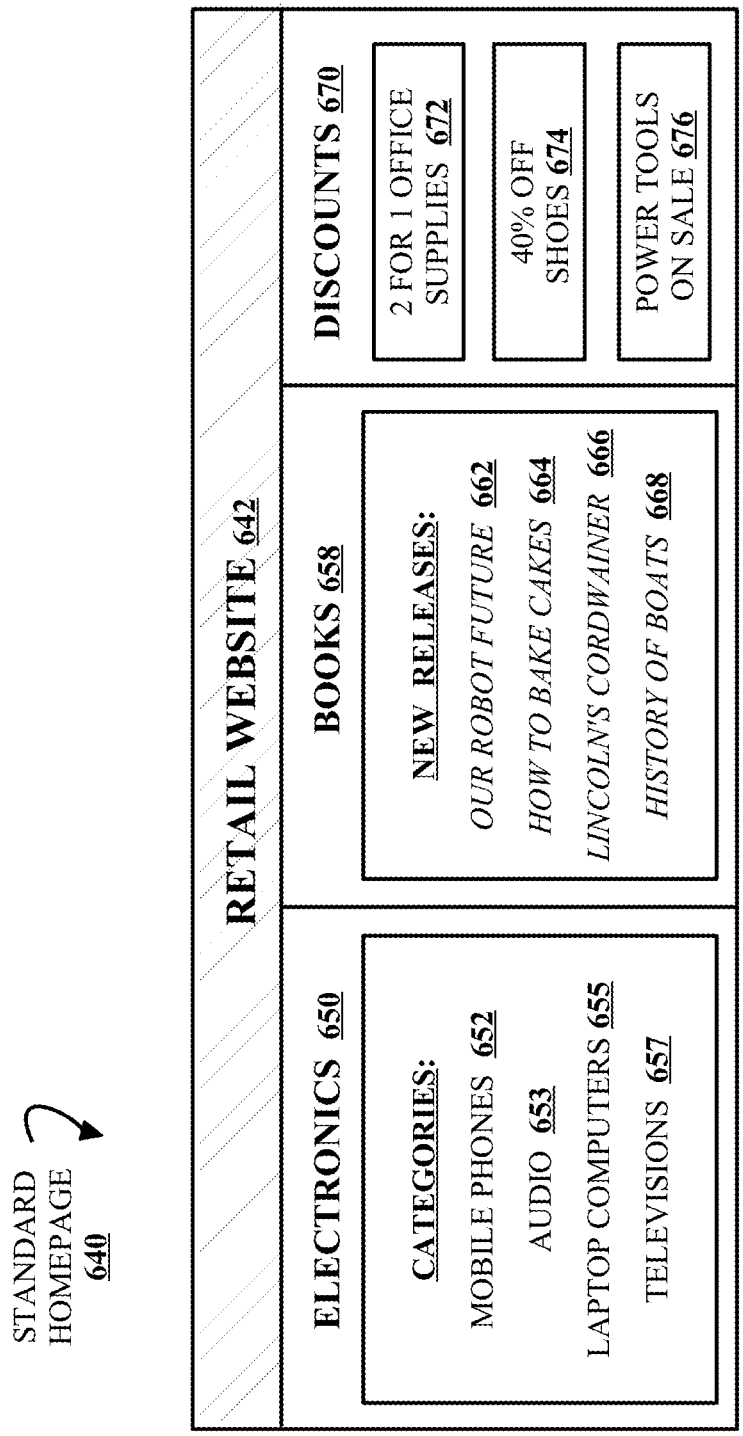
FIG. 6B is a diagrammatic representation of an example of a standard retail website, according to some embodiments.

According to some embodiments, the information in the user profile 160 shown in FIG. 6A can be used to determine what content on a website should be emphasized for the user. An example of a website 640 will be discussed in reference to FIGS. 6B and 6C. Determining what content should be emphasized for a viewer can be done by a computer processor 102 employing a virtual content ranking module 128 stored in a computer memory 104. The zone visits recorded in the user profile 160 in this example indicate that they may have some interest in content related to each zone category.

Additional information stored in the user profile 160, such as dwell time 610 and purchase history 630, can be taken into account when ranking the virtual content. In some embodiments, the virtual content ranking module 128, shown in FIG. 1, may use dwell time ranges that correspond to interest levels to determine rankings. In some examples, dwell time ranges that indicate certain interest levels can be defined. For example, 0-10 minutes spent in a spatial zone may indicate that a user has low interest in its contents; 11-20 minutes may indicate moderate interest; and 21 minutes or longer may indicate high interest. Taking into account these ranges, the user zone visits 607 and dwell times 610 in the user profile 160 indicate that the user has a high interest in Dutch painters 622; a moderate interest in televisions 620, pet supplies 624, and gardening supplies 626; and a low interest in mobile phones 618 and bakery items 628.

The purchase history data 630 that is stored in the user profile 160 can help narrow the user's predicted interests further. For example, the system had determined that the user had a low interest in mobile phones based on their dwell time (7 min) within that zone 618. However, their purchase of a mobile phone 632 indicates that they may be interested in mobile phones or items related to mobile phones. Because they just purchased a mobile phone, they may not be interested in buying another one in the near future and may instead be interested in mobile accessories, such as a mobile phone case, charger, or headphones. The user's purchases of cat litter 634 and carrot seeds 636 at the grocery store 616 indicate that they may have an interest in cats, vegetables, and gardening.

Figure 6C:
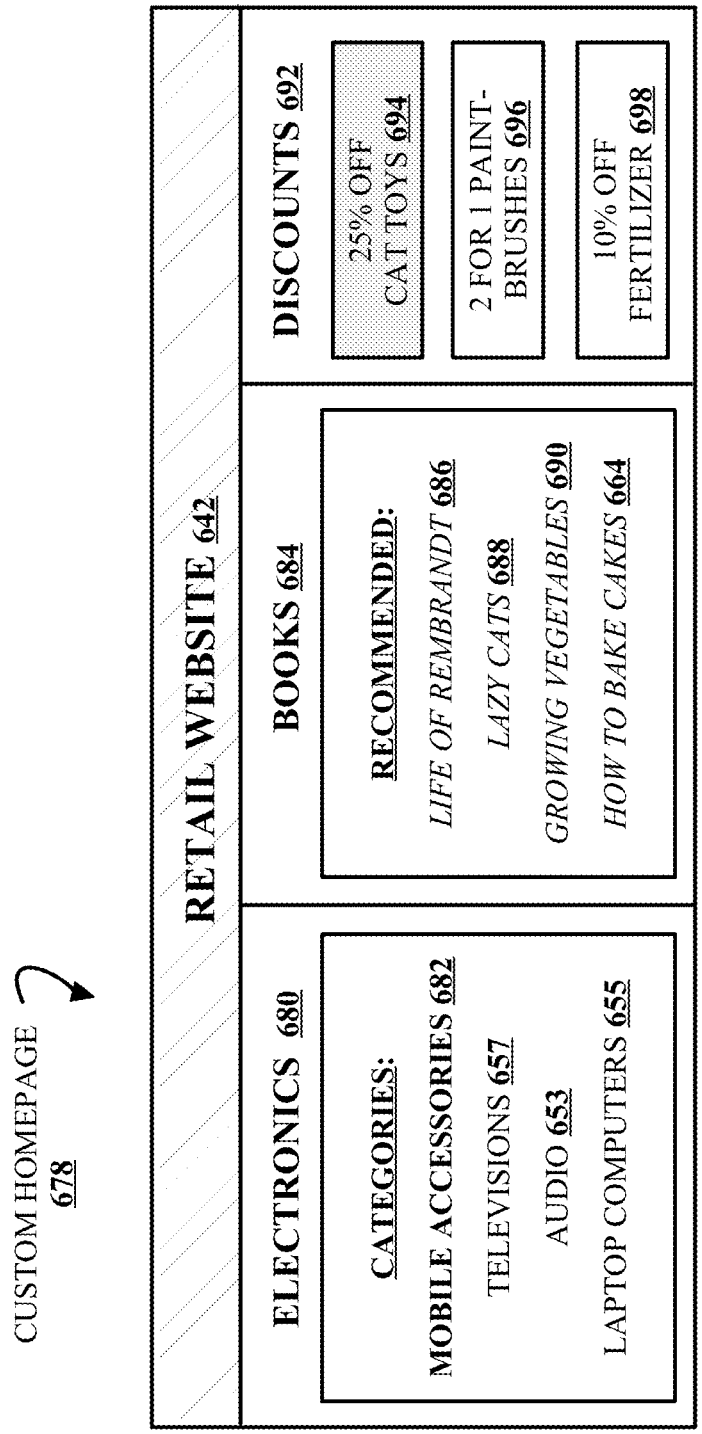
FIG. 6C is a diagrammatic representation of an example of a customized retail website, according to some embodiments.

FIGS. 6B and 6C are diagrammatic representations of an example of a standard retail website and a customized retail website, respectively. On the standard homepage 640, shown in FIG. 6B, three different sections are present, each containing links that may be of general interest to any site visitor. These sections are electronics 650, books 658, and discounts 670. The electronics section 650 advertises, in descending order, mobile phones 652, audio equipment 653, laptop computers 655, and televisions 657. The books section 658 advertises a list of newly released books, including a book about the future of robots 662, a book about baking cakes 664, a book related to Abraham Lincoln 666, and a book about the history of boats 668. The discounts 670 section on the standard homepage 640 lists sales on office supplies 672, shoes 574, and power tools 676.

The custom homepage 678 of the retail website 642 is shown in FIG. 6C. This homepage 678 has been customized, in a manner similar to that discussed in reference to FIGS. 5A and 5B, to introduce and emphasize content that may appeal to the user whose user profile 160 is displayed in FIG. 6A. In this example, the customization takes the form of reordering lists, changing some text to bold, and retitling some sections. It also entails adding and removing items and changing colors.

Like the standard homepage 640 shown in FIG. 6B, the custom homepage 678 in FIG. 6C is organized into three sections: electronics 680, books 684, and discounts 692. While the electronics section 650 on the standard homepage 640 puts a link advertising mobile phones at the top of the list 652, the custom electronics section 680 has a link advertising mobile accessories 682 in bold at the top of its list. This is because, as seen in the user profile 160 in FIG. 6A, the user purchased a mobile phone 632 in an electronics store 612 and thus may be more likely to purchase a mobile accessory while shopping online than another mobile phone. Next on the list in the electronics section 680 is a link advertising televisions 657, raising the position of this link from last on the list in the standard electronics section 650, thereby giving it more emphasis. This is because the user profile 160 has a dwell time in the spatial zone containing televisions 620 that indicates moderate interest in that category. The user profile 160 does not contain information about audio equipment 653 or laptop computers 655. Links to these two categories are still present in the custom electronics section 680, but they have been displaced by the other two links and are thus lower on the list than they were in the standard electronics section 652.

The books section 684 on the custom homepage 678 in FIG. 6C contains a list of books that are recommended to the user whose profile 160 is displayed in FIG. 6A, while the books section 658 on the standard homepage 640 shown in FIG. 6B contains a list of newly released books that may appeal to a general audience. The recommended books 684 on the custom homepage 678 are selected based on content rankings corresponding to the user profile 160, shown in FIG. 6A. Because the user profile 160 has record of a dwell time in the museum exhibit 622 of works by Dutch painters indicating a high level of interest in Dutch painters, a high ranking can be given to virtual content related to Dutch painters or art in general. Therefore, a biography of Rembrandt van Rijn 686 is recommended in the custom books section 684, as shown in FIG. 6C. The user's purchases of cat litter 634 and carrot seeds 636 at the grocery store 616 indicate that they may have an interest in cats, vegetables, and gardening. Because of this, books related to cats 688 and growing vegetables 690 are recommended as well. Referring to FIG. 6A, the user's visit to the grocery store 616 zone selling bakery items 628, though not long, indicates a possible interest in baked goods. For this reason, the newly released book about baking 664 listed in the standard Book section 658 is also recommended on the custom homepage 678 shown in FIG. 6C.

The discounts section 692 on the custom homepage 678 contains advertisements for discounts on items related to categories that have high rankings. At the top of the list, with a different color than the other links in order to add more emphasis, is an advertisement for a sale on cat toys 694. The next link advertises a special offer for paintbrushes 696 and the third advertises a sale on fertilizer 698. These links were selected due to the user's indicated interest in cats, art, and gardening.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adjusting virtual content in a virtual environment based on dwell time in a physical space, comprising:
   receiving definitions of zones in the physical space;
   receiving definitions of tags from the defined zones, wherein the defined tags describe categories of physical items within the defined zones, and wherein the defined tags comprise a first tag;
   storing the defined tags in a set of zone tags in a computer memory;
   creating, by a processor, a user interest profile using physical actions of a user in the physical space, including:

receiving an indication from a mobile device detector that a mobile device is present within a first zone of the defined zones, wherein the first zone is tagged by the first tag;

in response to the indication, determining a dwell time of the mobile device in the first zone, wherein the dwell time is an amount of time that the mobile device is detected by the mobile device detector within the first zone;

assigning an interest level to the first tag using the dwell time of the mobile device in the first zone;

applying, by a processor, the user interest profile to a virtual environment, including:

receiving a request for a web page from the user from a location outside of the physical space, wherein the web page includes at least two elements of virtual content;

mapping the first tag to the at least two elements of virtual content in the requested web page;

assigning rankings to the at least two elements of the virtual content in the virtual environment for the user based on the assigned interest levels in the user interest profile and on the mapping;

generating a web page responsive to the web page request and the assigned rankings; and transmitting the generated web page to the user.

2. The method of claim 1, wherein the user profile is a federated user profile adapted to be stored in multiple locations.

3. The method of claim 1, wherein the mobile device is further detected using at least one additional mobile device detector.

4. The method of claim 1, wherein the adjusting the at least two elements of the virtual content in the virtual environment is selected from a group that consists of altering, repositioning, adding, and removing at least one element of the virtual content.

5. The method of claim 1, wherein the at least two elements of the virtual content in the virtual environment are selected from a group that consists of a word, number, symbol, and image.

6. The method of claim 1, wherein the at least two elements of the virtual content in the virtual environment are colors.

7. The method of claim 1, further comprising:

receiving an indication that the mobile device is present within a second zone of the defined zones;

in response to the indication that the mobile device is present within the second zone, determining a dwell time of the mobile device in the second zone; and adjusting the interest level based on the dwell time of the mobile device in the second zone.

8. The method of claim 1, wherein the defined tags comprise an identity of a university department associated with the defined zone.

9. A computer system for adjusting virtual content in a virtual environment based on dwell time in a physical space, the computer system comprising:

at least one processing component;

at least one memory component; and program instructions stored on at least one of the at least one memory component for execution by the at least one processing component, the program instructions comprising:

program instructions to receive definitions of zones in the physical space;

program instructions to receive definitions of tags from the defined zones, wherein the defined tags describe categories of physical items within the defined zones, and wherein the defined tags comprise a first tag;

program instructions to store the defined tags in a set of zone tags in the at least one memory component;

program instructions to map the set of zone tags to the virtual content in the virtual environment;

program instructions to create a user interest profile using physical actions of a user in the physical space, including:

program instructions to receive, from a mobile device detector in the physical space, an indication that a mobile device is present within a first zone of the defined zones, wherein the first zone is tagged by the first tag;

program instructions to, in response to the indication that the mobile device is in the first zone, determine a dwell time of the mobile device in the first zone, wherein the dwell time is an amount of time that the mobile device is detected by the mobile device detector within the first zone;

program instructions to assign an interest level to the first tag using the dwell time of the mobile device in the first zone;

program instructions to apply the user interest profile to a virtual environment, including:

program instructions to receive a request for a web page from the user from a location outside of the physical space, wherein the web page includes at least two elements of virtual content;

program instructions to map the first tag to the at least two elements of virtual content in the requested web page;

program instructions to assign rankings to the at least two elements of the virtual content in the virtual environment for the user based on the assigned interest levels in the user interest profile and on the mapping;

program instructions to generate a web page responsive to the web page request and the assigned rankings; and program instructions to transmit the generated web page to the user.

10. The system of claim 9, wherein the user profile is a federated user profile adapted to be stored in multiple locations.

11. The system of claim 9, wherein the adjusting the at least two elements of the virtual content in the virtual environment is selected from a group that consists of altering, repositioning, adding, and removing at least one element of the virtual content.

12. The system of claim 9, wherein the at least two elements of the virtual content in the virtual environment are selected from a group that consists of a word, number, symbol, and image.

13. The system of claim 9, wherein the at least two elements of the virtual content in the virtual environment are colors.

14. A computer program product for adjusting virtual content in a virtual environment based on dwell time in physical spaces, the computer program product comprising a computer readable storage medium having program instructions embodied therewith, wherein the computer readable storage medium is not a transitory system per se, the program instructions executable by a processor to cause the device to perform a method comprising:
  receiving definitions of zones in a physical space;
  receiving definitions of tags from the defined zones, wherein the defined tags describe categories of physical items within the defined zones, and wherein the defined tags comprise a first tag;
  storing the defined tags in a set of zone tags in a computer memory;
  creating a user interest profile using physical actions of a user in the physical space, including:
    receiving an indication from a mobile device detector that a mobile device is present within a first zone of the defined zones, wherein the first zone is tagged by the first tag;
    in response to the indication, determining a dwell time of the mobile device in the first zone, wherein the dwell time is an amount of time that the mobile device is detected by the mobile device detector within the first zone;
    assigning an interest level to the first tag using the dwell time of the mobile device in the first zone;
  applying, by a processor, the user interest profile to a virtual environment, including:
    receiving a request for a web page from the user from a location outside of the physical space, wherein the web page includes at least two elements of virtual content;
    mapping the first tag to the at least two elements of virtual content in the requested web page;
    assigning rankings to the at least two elements of the virtual content in the virtual environment for the user based on the assigned interest levels in the user interest profile and on the mapping;
    generating a web page responsive to the web page request and the assigned rankings; and
    transmitting the generated web page to the user.

15. The computer program product of claim 14, wherein the interest level is stored in a user profile, and wherein the user profile is a federated user profile adapted to be stored in multiple locations.

* * * * *